(12) United States Patent
Lee

(10) Patent No.: US 9,398,045 B2
(45) Date of Patent: Jul. 19, 2016

(54) NETWORK DEVICE AND METHOD FOR AVOIDING ADDRESS RESOLUTION PROTOCOL ATTACK

(71) Applicant: HON HAI PRECISION INDUSTRY CO., LTD., New Taipei (TW)

(72) Inventor: Da-Jheng Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/481,637

(22) Filed: Sep. 9, 2014

(65) Prior Publication Data

US 2015/0264081 A1    Sep. 17, 2015

(51) Int. Cl.
*H04L 29/06* (2006.01)
*H04L 29/12* (2006.01)

(52) U.S. Cl.
CPC .......... *H04L 63/1466* (2013.01); *H04L 61/103* (2013.01)

(58) Field of Classification Search
CPC . H04L 63/1466; H04L 63/1475; H04L 61/10; H04L 61/103
See application file for complete search history.

(56) References Cited

U.S. PATENT DOCUMENTS

| | | | | |
|---|---|---|---|---|
| 7,380,272 B2 * | 5/2008 | Sharp | ................ | H04L 12/2602 726/11 |
| 7,552,478 B2 * | 6/2009 | Seki | ................ | H04L 63/1466 726/23 |
| 7,562,390 B1 * | 7/2009 | Kwan | ................ | H04L 63/0236 726/23 |
| 9,083,716 B1 * | 7/2015 | Cho | ................ | H04L 61/103 |
| 2003/0140283 A1 * | 7/2003 | Nishio | ............. | H04L 29/12018 714/43 |
| 2004/0148521 A1 * | 7/2004 | Cohen | ................ | H04L 63/1491 726/22 |
| 2006/0209818 A1 * | 9/2006 | Purser | ............. | H04L 29/12009 370/389 |
| 2008/0060067 A1 * | 3/2008 | Kim | ................ | H04L 29/12009 726/7 |

(Continued)

FOREIGN PATENT DOCUMENTS

| | | |
|---|---|---|
| CN | 101345643 A | 1/2009 |
| CN | 101035713 A | 1/2010 |

(Continued)

OTHER PUBLICATIONS

Vivek Ramachandran et al. "Detecting ARP Spoofing: An Active Technique" Proceedings of the First International COnference on Information Systems Security (ICISS 2005), Dec. 2005 (13 pages) http://www.vivekramachandran.com/docs/arp-spoofing.pdf.*

(Continued)

*Primary Examiner* — Joseph P Hirl
*Assistant Examiner* — Thomas Gyorfi
(74) *Attorney, Agent, or Firm* — ScienBiziP, P.C.

(57) ABSTRACT

A network device records IP addresses and MAC addresses of a plurality of CPEs to form an address mapping table, sends first ARP request packets to the plurality of CPEs according to the IP addresses in the address mapping table, and receives first ARP response packets. The network device compares the MAC addresses in the first ARP response packets with the corresponding MAC addresses in the address mapping table to identify an unusual MAC address. The network device generates a plurality of IP addresses randomly, sends second ARP request packets according to the plurality of IP addresses, and receives second ARP response packets. In response to a MAC address in the second ARP response packets being same with the unusual MAC address, the network device blocks packets transmission corresponding to the unusual MAC address.

12 Claims, 3 Drawing Sheets

(56) References Cited

U.S. PATENT DOCUMENTS

| | | | |
|---|---|---|---|
| 2008/0107065 A1* | 5/2008 | Lescuyer | H04L 63/1466 370/328 |
| 2010/0242084 A1* | 9/2010 | Keeni | H04L 63/20 726/1 |
| 2011/0179486 A1* | 7/2011 | Park | H04L 29/12028 726/22 |
| 2012/0278888 A1 | 11/2012 | Lin et al. | |
| 2014/0325651 A1* | 10/2014 | Kim | H04L 63/1483 726/23 |

FOREIGN PATENT DOCUMENTS

| | | | | |
|---|---|---|---|---|
| EP | 2154858 A1 * | 2/2010 | | H04L 63/1466 |
| WO | WO 2011129088 A1 * | 10/2011 | | H04L 12/40032 |

OTHER PUBLICATIONS

"SonicOS 5.6—Mac-IP Anti-Spoof" article dated Dec. 18, 2009 by Google (9 pages) http://www.sonicwall.com/downloads/SonicOS_Enhanced_MAC_IP_Anti_Spoof_Feature_Module.pdf.*

"Warning: IP spoofing prevention in attack detection plugin is a fake!" web forum posts from Mar. 9-11, 2006 (2 pages) http://www.outpostfirewall.com/forum/archive/index.php/t-16800.html.*

* cited by examiner

NETWORK DEVICE AND METHOD FOR AVOIDING ADDRESS RESOLUTION PROTOCOL ATTACK

FIELD

The present disclosure generally relates to network communication, and especially relates to a network device and method for avoiding address resolution protocol (ARP) attacks.

BACKGROUND

Currenty, network devices may need to obtain a media access control (MAC) address of a destination device before they can communicate with each other. ARP may be used to obtain the MAC address. ARP is able to transform an Internet protocol (IP) address into a corresponding MAC address. ARP functions to query the MAC address of the destination device according to the IP address. However, ARP is easy to be attacked, hackers may send fake ARP response packets to cheat other users, thus influence the normal communication in network.

BRIEF DESCRIPTION OF THE DRAWINGS

Implementations of the present technology will now be described, by way of example only, with reference to the attached figures.

DETAILED DESCRIPTION

Figure 1:
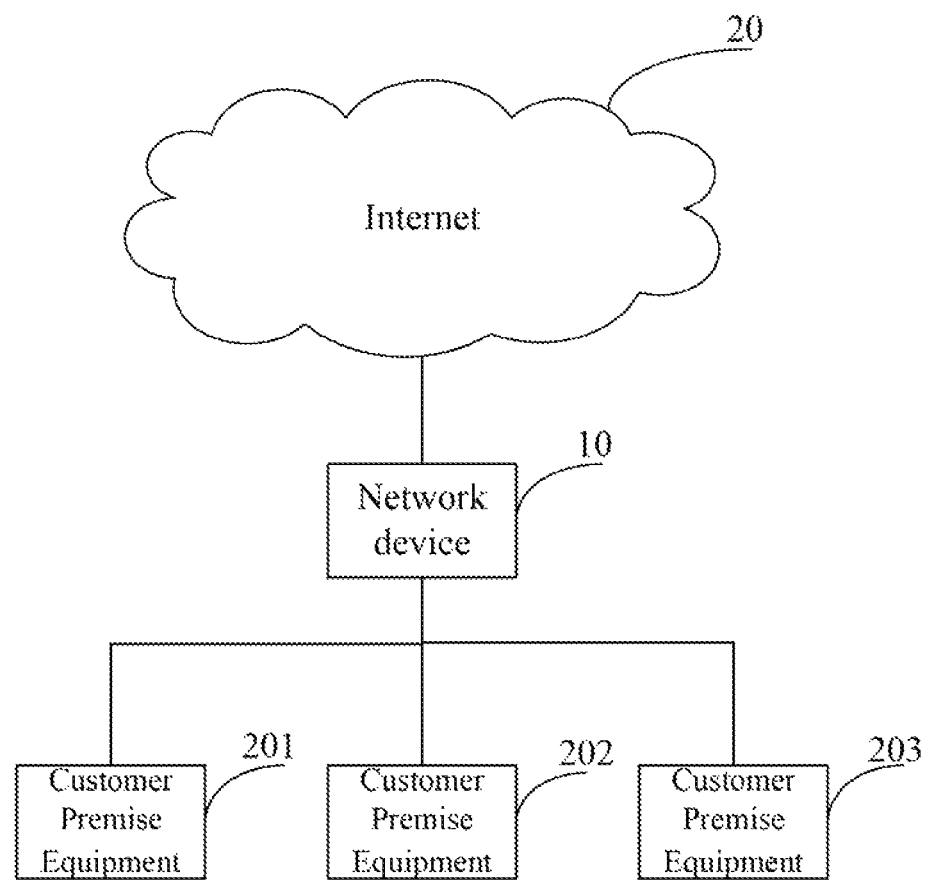
FIG. 1 is a diagrammatic view of an environment of the network device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a diagrammatic view of an environment of the network device. In one embodiment, the network device 10 connects with a plurality of customer premise equipment (CPE) 201, 202, 203, the network device 10 and the CPEs 201, 202, 203 are in the same local area network (LAN), and the CPEs 201, 202, 203 access the Internet 20 through the network device 10. The network device 10 may be a router, a switchboard or a gateway. The CPEs 201, 202, 203 may be personal computers (PC), set top boxes (STB) or mobile phones. The number of the CPEs can be one or more than one. The present disclosure is not limited thereto.

Figure 2:
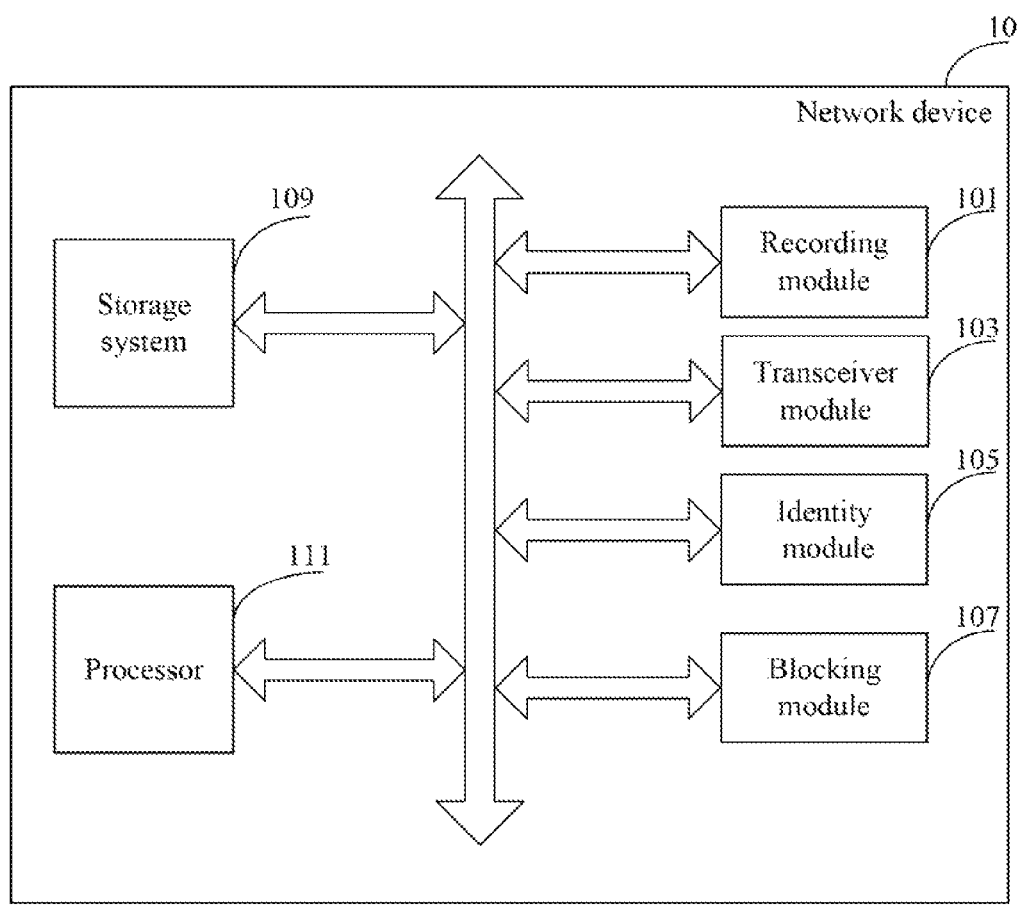
FIG. 2 is a block diagram of one embodiment of the network device.

FIG. 2 is a block diagram of one embodiment of the network device 10. In one embodiment, the network device 10 comprises a recording module 101, a transceiver module 103, an identity module 105, a blocking module 107, a storage system 109 and a processor 111. The module 101-107 can include computerized code in the form of one or more programs. The one or more programs are stored in the storage system 109, and the storage system 109 can be a non-transitory device. The computerized code includes instructions executed by the processor 111 to provide functions for the modules 101-107.

In one embodiment, the recording module 101 records the IP addresses and the MAC addresses of the plurality of CPEs 201, 202, 203 connected with the network device 10 to form an address mapping table. The network device 10 maintains the address mapping table to transfer the packets in the LAN.

In one embodiment, the transceiver module 103 sends first ARP request packets to the CPEs 201, 202, 203 according to the IP addresses in the address mapping table. After the CPEs 201, 202, 203 have received the ARP request packets, they will reply with their address information by sending first ARP response packets to the transceiver module 103. The transceiver module 103 receives the first ARP response packets, and the first ARP response packets comprise the MAC addresses of the CPEs 201, 202, 203.

In one embodiment, the identity module 105 compares the MAC addresses in the first ARP response packets with the corresponding MAC addresses in the address mapping table to identify unusual MAC addresses. Since the first ARP response packets comprise the IP addresses and the MAC addresses of the CPEs 201, 202, 203, the address mapping table comprises the corresponding address information, the identity module 105 identifies the unusual MAC addresses by determining if they are the same. In this embodiment, the identity module 105 extracts the MAC addresses from the first ARP response packets, and compares the MAC addresses to the corresponding MAC addresses in the address mapping table. A MAC address is unusual upon condition that the MAC addresses in the first ARP response packets are not the same as the corresponding MAC addresses in the address mapping table. Since the CPEs in the LAN can open and close frequently, the IP addresses of the CPEs can change, therefore an unusual MAC address does not necessarily mean that the CPEs using the unusual MAC address are hackers, new CPE's can be added within the LAN. Therefore, after having identified the unusual MAC address, further verification is required.

In one embodiment, when an unusual MAC address exists, the recording module 101 generates a plurality of IP addresses randomly according to the address mapping table. The plurality of IP addresses may be a plurality of IP addresses not belonging to the LAN. In other embodiments the plurality of IP addresses also may be a plurality of IP addresses not used in the LAN.

In one embodiment, the transceiver module 103 sends second ARP request packets according to the plurality of IP addresses, and receives second ARP response packets. The destinations of the second ARP request packets are the plurality of IP addresses. When the second ARP response packets are received, it indicates that there may be a hacker in the LAN or there may be any new attendee joining the LAN. Therefore, further analysis of the second ARP response packets is needed to determine whether the hacker exists.

In one embodiment, the identity module 105 compares the MAC addresses in the second ARP response packets with the unusual MAC addresses to identify the hacker. The identity module 105 extracts the MAC addresses from the second ARP response packets, compares the MAC addresses with the unusual MAC addresses, and determines if they are the same. When the MAC address in the second ARP response packets is the same as the unusual MAC address, the CPE having the unusual MAC address is identified to be a hacker. The hacker having the IP address will be disguised and reply with an ARP response packet when receiving an ARP request packet for a IP address. Therefore, when sending second ARP request packets according to the randomly generated IP addresses sequence, if the second ARP response packets are received, and the MAC address in the second ARP response packets are the same as the unusual MAC addresses, the CPE having the unusual MAC address is identified to be a hacker.

In one embodiment, the blocking module 107 blocks the packets transmission according to the MAC address of the hacker. After the hackers have been identified, the blocking module 107 blocks the packets transmission corresponding to the unusual MAC address to avoid ARP attacks. In addition, the recording module 101 deletes the IP address and the MAC address of the hacker in the address mapping table.

Figure 3:
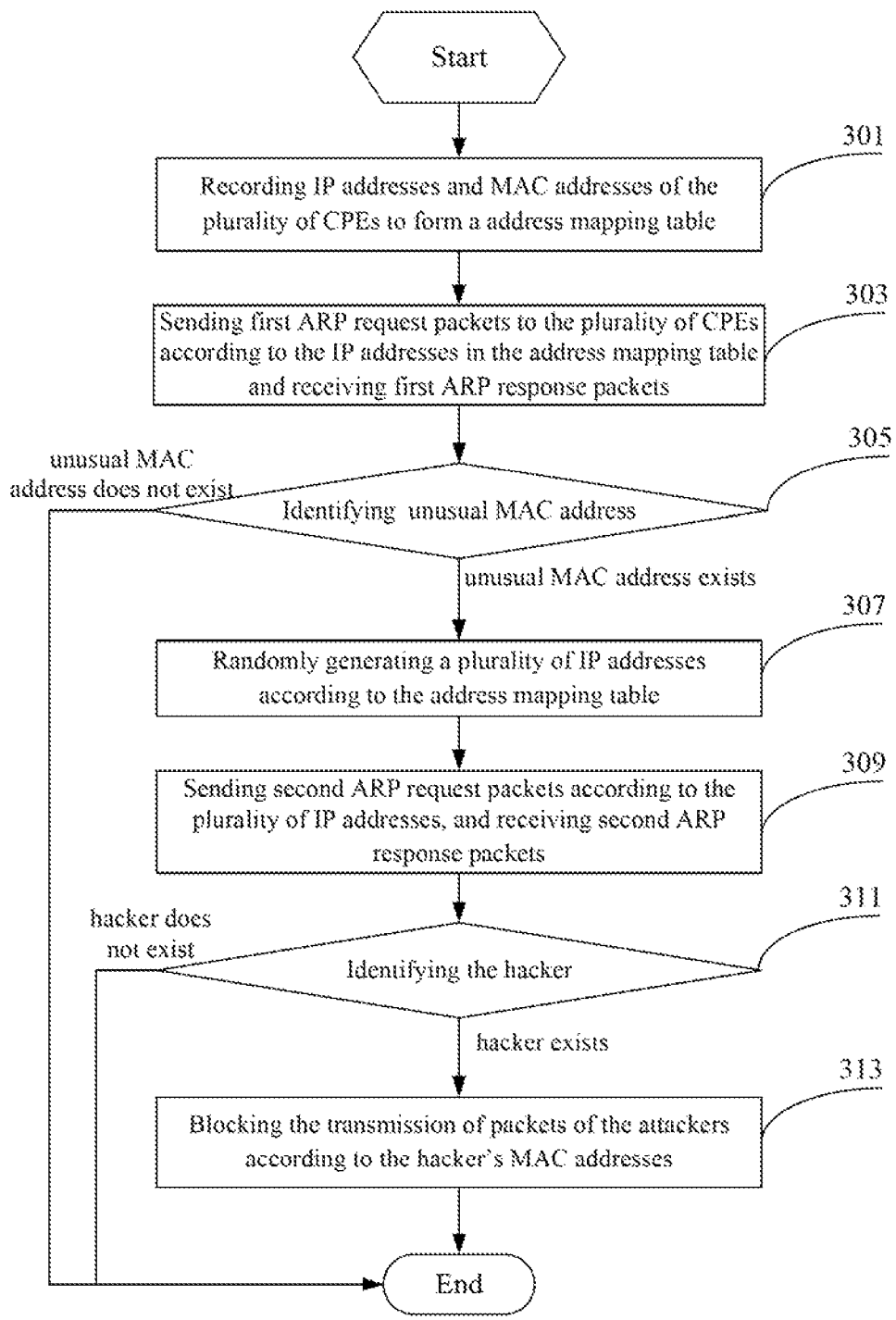
FIG. 3 is a flowchart of one embodiment of a method for avoiding ARP attack.

FIG. 3 is a flowchart of one embodiment of a method for avoiding ARP attack. In one embodiment, the method functions by modules in FIG. 2 in the following manner.

In block 301, the recording module 101 records IP addresses and MAC addresses of the plurality of CPEs 201, 202, 203 to form an address mapping table.

In block 303, the transceiver module 103 sends first ARP request packets to the CPEs 201, 202, 203 according to the IP addresses in the address mapping table and receives first ARP response packets.

In block 305, the identity module 105 compares the MAC addresses in the first ARP response packets with the corresponding MAC addresses in the address mapping table to identify unusual MAC address. The identity module 105 extracts the MAC addresses from the first ARP response packets, and compares the MAC addresses with the corresponding MAC addresses in the address mapping table. The MAC address is unusual upon condition that the MAC addresses in the first ARP response packets are not the same with the corresponding MAC addresses in the address mapping table.

In block 307, when the unusual MAC address exists, the recording module 101 randomly generates a plurality of IP addresses according to the address mapping table. The plurality of IP addresses may be a plurality of IP addresses not belonging to the LAN. In other embodiments, the plurality of IP addresses also may be a plurality of IP addresses not used in the LAN.

In block 309, the transceiver module 103 sends second ARP request packets according to the plurality of IP addresses, and receives second ARP response packets. The destinations of the second ARP request packets are the plurality of IP addresses. When the second ARP response packets are received, it indicates that there may be a hacker in the LAN or there may be any new attendee joining the LAN. Therefore, further analysis of the second ARP response packets is needed to determine whether the hacker exists.

In block 311, the identity module 105 compares the MAC addresses in the second ARP response packets with the unusual MAC address to identify a hacker. The identity module 105 extracts the MAC addresses from the second ARP response packets, compares the MAC addresses to the unusual MAC address, and determines whether they are the same. When a MAC address in the second ARP response packets is the same as the unusual MAC address, the CPE having the unusual MAC address is identified to be a hacker.

In block 313, when a hacker exists, the blocking module 107 blocks the packets transmission according to the MAC address of the hacker. In addition, the recording module 101 deletes the IP address and the MAC address of the hacker in the address mapping table.

The network device and the method for avoiding ARP attacks can detect the CPEs in the same LAN and identify the ARP hackers, and can block the transmission of the attacking packets.

Many details are often found in the art such as the other features of a computer. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A network device, connecting with a plurality of customer premise equipments (CPEs), the network device comprising:

at least one processor;

a storage system; and one or more programs that are stored in the storage system and executed by the at least one processor, the one or more programs comprising instructions for:

recording internet protocol (IP) addresses and media access control (MAC) addresses of the plurality of CPEs to form an address mapping table;

sending first address resolution protocol (ARP) request packets to the plurality of CPEs according to the IP addresses in the address mapping table and receiving first ARP response packets;

comparing the MAC addresses in the first ARP response packets with the corresponding MAC addresses in the address mapping table to identify an unusual MAC address;

generating a plurality of IP addresses randomly that are different from the IP addresses in the address mapping table upon condition that the unusual MAC address exists;

sending second ARP request packets according to the plurality of IP addresses, and receiving second ARP response packets; and in response to a MAC address in the second ARP response packets being same with the unusual MAC address, blocking packets transmission corresponding to the unusual MAC address.

2. The network device as claimed in claim 1, wherein the MAC address is unusual upon condition that the MAC addresses in the first ARP response packets are not the same with the corresponding MAC addresses in the address mapping table.

3. The network device as claimed in claim 1, wherein the network device and the plurality of CPEs are in a same local area network (LAN) and the plurality of IP addresses generated randomly is a plurality of IP addresses not belonging to the LAN.

4. The network device as claimed in claim 1, wherein the network device and the plurality of CPEs are in a same local area network (LAN) and the plurality of IP addresses generated randomly is a plurality of IP addresses not used in the LAN.

5. The network device as claimed in claim 1, wherein when one MAC address in the second ARP response packets is the same with the unusual MAC address, the CPE with the unusual MAC address is identified to be a hacker.

6. The network device as claimed in claim 1, wherein the one or more programs further comprising instructions for deleting the IP address and the MAC address of the hacker in the address mapping table.

7. A method for avoiding address resolution protocol (ARP) attack, applied in a network device, the network device connecting with a plurality of customer premise equipments (CPEs), the method comprising:
    recording internet protocol (IP) addresses and media access control (MAC) addresses of the plurality of CPEs to form an address mapping table;
    sending first ARP request packets to the plurality of CPEs according to the IP addresses in the address mapping table and receiving first ARP response packets;
    comparing the MAC addresses in the first ARP response packets with the corresponding MAC addresses in the address mapping table to identify an unusual MAC address;
    generating a plurality of IP addresses randomly that are different from the IP addresses in the address mapping table upon condition that the unusual MAC address exists;
    sending second ARP request packets according to the plurality of IP addresses, and receiving second ARP response packets; and
    in response to a MAC address in the second ARP response packets being same with the unusual MAC address, blocking packets transmission corresponding to the unusual MAC address.

8. The method as claimed in claim 7, wherein the MAC address is unusual upon condition that the MAC addresses in the first ARP response packets are not the same with the corresponding MAC addresses in the address mapping table.

9. The method as claimed in claim 7, wherein the network device and the plurality of CPEs are in a same local area network (LAN), and the plurality of IP addresses generated randomly is a plurality of IP addresses not belonging to the LAN.

10. The method as claimed in claim 7, wherein the network device and the plurality of CPEs are in a same local area network (LAN), and the plurality of IP addresses generated randomly is a plurality of IP addresses not used in the LAN.

11. The method as claimed in claim 7, wherein when one MAC address in the second ARP response packets is the same with the unusual MAC address, the CPE with the unusual MAC address is identified to be a hacker.

12. The method as claimed in claim 7, further comprising: deleting the IP address and the MAC address of the hacker in the address mapping table.

\* \* \* \* \*